(12) United States Patent
Klingels (10) Patent No.: US 11,976,580 B2
(45) Date of Patent: May 7, 2024

(54) AIRCRAFT HAVING A HEAT ENGINE AND DEVICE FOR USING THE EXHAUST GASES FROM THE HEAT ENGINE

(71) Applicant: MTU Aero Engines AG, Munich (DE)

(72) Inventor: Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 336 days.

(21) Appl. No.: 17/439,279

(22) PCT Filed: Mar. 13, 2020

(86) PCT No.: PCT/DE2020/000055
§ 371 (c)(1),
(2) Date: Sep. 14, 2021

(87) PCT Pub. No.: WO2020/187345
PCT Pub. Date: Sep. 24, 2020

(65) Prior Publication Data
US 2023/0150678 A1     May 18, 2023

(30) Foreign Application Priority Data
Mar. 15, 2019   (DE) .................. 10 2019 203 595.7

(51) Int. Cl.
*B64D 33/04*    (2006.01)
*B01D 5/00*     (2006.01)
*F01N 3/00*     (2006.01)

(52) U.S. Cl.
CPC ........... *F01N 3/005* (2013.01); *B01D 5/0081* (2013.01); *B64D 33/04* (2013.01)

(58) Field of Classification Search
CPC ......... F01N 3/005; B64D 33/04; B64D 27/12; B64D 27/18; B01D 5/0081
See application file for complete search history.

(56) References Cited

U.S. PATENT DOCUMENTS

| | | | |
|---|---|---|---|
| 1,924,122 | A | 8/1933 | Jones |
| 2,446,210 | A | 8/1948 | Chadsey |
| 2,928,627 | A | 3/1960 | Johnson |
| 3,448,945 | A | 6/1969 | Ascani, Jr. |
| 3,658,279 | A | 4/1972 | Robertson |
| 10,427,775 | B2 * | 10/2019 | Mores ...................... B64C 1/16 |
| 2016/0010589 | A1 | 1/2016 | Rolt |
| 2017/0292412 | A1 | 10/2017 | Fonseca |
| 2018/0194457 | A1 | 7/2018 | Gueuning et al. |

FOREIGN PATENT DOCUMENTS

| | | |
|---|---|---|
| DE | 2413324 A1 | 10/1975 |
| DE | 4323719 A1 | 1/1995 |
| DE | 10035541 A1 | 2/2002 |
| DE | 102018203159 A1 | 9/2019 |
| EP | 0634563 A1 | 1/1995 |
| EP | 1267064 A1 | 12/2002 |
| EP | 2966266 A1 | 1/2016 |
| EP | 3048281 A1 | 7/2016 |
| WO | 2019223823 A1 | 11/2019 |

\* cited by examiner

*Primary Examiner* — Steven M Sutherland
(74) *Attorney, Agent, or Firm* — Hinckley, Allen & Snyder, LLP; David R. Josephs (57) ABSTRACT

The present invention relates to an aircraft having at least one wing, on which at least one propulsion unit is arranged, comprising at least one heat engine, especially a gas turbine, as well as an exhaust gas passage for conducting exhaust gas of the heat engine into and inside the wing.

3 Claims, 8 Drawing Sheets

AIRCRAFT HAVING A HEAT ENGINE AND DEVICE FOR USING THE EXHAUST GASES FROM THE HEAT ENGINE

BACKGROUND OF THE INVENTION

The present invention relates to an aircraft having at least one wing, on which at least one propulsion unit is arranged, comprising at least one heat engine, especially a gas turbine.

SUMMARY OF THE INVENTION

An object of one implementation of the present invention is to improve the operation, especially the economy and/or environmental compatibility of aircraft.

This object is achieved by an aircraft of the present invention. Advantageous embodiments of the invention are discussed in detail below.

According to one embodiment of the present invention, an aircraft, especially an airplane, being in one embodiment a passenger plane or cargo plane, comprises at least one, preferably at least and especially precisely two wings, especially airfoils or surfaces, having in one embodiment at least one propulsion unit situated beneath it or them (respectively), comprising at least one heat engine, being in one embodiment a gas turbine. The propulsion unit in one embodiment is a turbine jet engine, especially a turbofan or turboprop engine.

In one embodiment, the heat engine is operated with a working gas in at least one operating point, especially in a normal operation, a gas having a water percentage of at least 15 wt. %, especially at least 25 wt. %, and/or at most 50 wt. %, especially at most 35 wt. %, or it is provided for this purpose, is especially designed or is used for this purpose.

In one embodiment, the aircraft comprises a fuselage, on which the wing or wings are arranged in one embodiment at the sides or on mutually opposite sides, or it has a so-called fuselage/wing configuration.

The present invention can be employed with particular advantage in such aircraft or heat engines, especially on account of their aerodynamics or thermodynamics.

According to one embodiment of the present invention, the aircraft comprises an exhaust gas passage, having in one embodiment a single channel, at least partially, and/or multiple channels, at least partially, by which or through which or in which at least one portion, preferably at least 10 vol. %, especially at least 50 vol. %, in one embodiment at least 75 vol. %, and in one modification at least 95 vol. % of the exhaust gas (of) the heat engine, in one embodiment the entire exhaust gas, is taken into the wing and conducted inside the wing(s), or is provided for this purpose, in particular is designed or is used for this purpose.

In one embodiment, the aircraft comprises a first exhaust gas passage, having in one embodiment a single channel, at least partially, and/or multiple channels, at least partially, by which or through which or in which at least one portion, preferably at least 10 vol. %, especially at least 50 vol. %, in one embodiment at least 75 vol. % and in one modification at least 95 vol. % of the exhaust gas (of) a first heat engine of a first propulsion unit, situated on a first wing, in one embodiment this entire exhaust gas, is taken into this first wing and conducted inside this first wing, and at least one further exhaust gas passage, having in one embodiment a single channel, at least partially, and/or multiple channels, at least partially, by which or through which or in which at least one portion, preferably at least 10 vol. %, especially at least 50 vol. %, in one embodiment at least 75 vol. % and in one modification at least 95 vol. % of the exhaust gas (of) a (further) heat engine of a further propulsion unit, situated on the first or a further wing, in one embodiment this entire exhaust gas, is taken into these (first and further) wings and conducted inside this (first or further) wing, or is provided for this purpose, in particular is designed or is used for this purpose.

In this way, the exhaust gas can be utilized advantageously, in one embodiment by removing energy, especially thermal energy, or water from it. In this way, the operation, especially the economy and/or environmental compatibility of the aircraft can be improved.

In particular, in one embodiment, for this purpose, there is or are arranged in the exhaust gas passage or in one or more of the (respective) exhaust gas passages, downstream from the heat engine:

one or more heat exchangers, especially at least one evaporator or steam generator; and/or one or more turbines; and/or one or more condensers, comprising in one embodiment (respectively) at least one heat exchanger and/or at least one turbine, and/or condensing water from the exhaust gas of the heat engine or being provided for this purpose, especially is designed, or is used for this purpose; and/or one or more water separators, especially downstream from the condenser or at least one of the condensers.

In a preferred embodiment, there is arranged in the exhaust gas passage downstream from the heat engine at least one evaporator, downstream from the evaporator at least one condenser, especially at least one heat exchanger and/or, especially downstream from this heat exchanger, at least one turbine, and downstream from the condenser a water separator, whereby water is taken from the water separator, especially by means of a fluid passage described below, to the evaporator and at least partially evaporated in this by means of heat from the exhaust gas and/or superheated, or the aircraft is equipped for this purpose.

By heat exchangers or turbines, energy can be especially advantageously removed from the exhaust gas, and water can be removed especially advantageously by condensers or water separators. In this way, the operation, especially the economy and/or environmental compatibility of the aircraft can be (further) improved.

As explained above, in one embodiment a condenser may comprise or in particular may be composed of only one heat exchanger; in another embodiment it may comprise or in particular may be composed of a combination of heat exchanger and turbine. In one embodiment, at least one heat exchanger situated in the exhaust gas passage, especially a heat exchanger of a condenser situated in the exhaust gas passage, is arranged partially or entirely in the propulsion unit, in one embodiment in an exterior duct of a turbofan engine, and/or receives an oncoming and especially a flow of air moving through, which is delivered from the propulsion unit, in one embodiment from its fan(s), or it is designed for this purpose. In this way, in one embodiment this heat exchanger can be advantageously integrated in the engine.

In one embodiment, the exhaust gas passage is arranged at least partially in a pylon, which connects the (respective) propulsion unit to the (respective) wing.

Additionally or alternatively, in one embodiment the exhaust gas passage is arranged at least partially in a torsion box and/or a leading edge region of the (respective) wing. Here, in one embodiment, a leading edge region extends over at most a (front) third, especially a fourth, in one embodiment a fifth of the wing—looking in the flight direction of the aircraft. In one embodiment, a segment of the exhaust gas passage situated in the leading edge region lies downstream from a segment of the exhaust gas passage situated in the torsion box or the exhaust gas is taken in or through the exhaust gas passage at least partially through the torsion box into the leading edge region or the exhaust gas passage is provided for this purpose, especially is designed and is used for this purpose.

Additionally or alternatively, in one embodiment the (respective) exhaust gas passage is arranged at least partially in the fuselage of the aircraft, in one embodiment being at least partially in front of one or the torsion box, especially at least partially in front of a leading edge, of the wing and/or at least partially at the side, next to a loading or cargo compartment of the aircraft.

In this way, the exhaust gas can be conducted advantageously in one embodiment and/or one or more of the components arranged in the exhaust gas passage can be positioned advantageously, especially in a (more) space-saving and/or streamlined or aerodynamically (more) favorable manner.

In one embodiment, there are arranged in a fluid passage or in the at least partially single-channel fluid passage in one embodiment and/or at least partially multi-channel fluid passage, downstream from the or from one of the condensers and/or water separators (respectively)
- one or more water accumulators, especially tank(s); and/or
- one or more water treatments (devices); and/or
- one or more water pumps, especially at least one water pump upstream from and/or at least one water pump downstream from the or one of them water accumulators and/or water treatments (devices); and/or
- one or more heat exchangers, especially the heat exchanger or one or more of the heat exchangers (also) situated downstream from the (respective) heat engine in the exhaust gas passage or in one exhaust gas passage, thus in particular the evaporator or at least one of the evaporators; and/or
- one or more steam turbines.

Accordingly, the fluid passage in one embodiment carries liquid water and/or steam or is provided for this purpose, especially is designed and is used for this purpose.

Additionally or alternatively, in one embodiment one or more outlets of the fluid passage, especially downstream from the evaporator, is arranged at, especially in, the heat engine, in particular one or more outlets are arranged at, in particular in, a combustion chamber and/or one or more outlets are arranged at, in particular in, one or more turbine stages of the gas turbine.

In this way, in one embodiment the water can be utilized each time advantageously, especially in combination, and/or one or more of the components arranged in the fluid passage can be positioned advantageously, especially in a (more) space-saving and/or streamlined or aerodynamically (more) favorable manner.

Thus, in one embodiment exhaust gas energy is utilized to produce steam and the steam is supplied at least partially to the heat engine. In this way, in one embodiment, its thermal efficiency can be improved and/or the emission of pollutants can be reduced. In addition or alternatively, in one embodiment, the formation of condensation trails can be lessened or even entirely eliminated in this way.

Accordingly, in one embodiment, exhaust gas of the heat engine:
- exchanges heat in at least one of the heat exchangers, especially condenser-heat exchangers, with a cooling medium, in one embodiment being (fresh) air, especially in order to cool down the exhaust gas; and/or
- in at least one of the heat exchangers, especially evaporators, it exchanges heat with water and/or water vapor, in one embodiment being water (steam) from the exhaust gas, especially in order to cool down the exhaust gas and/or to heat the water, especially in order to evaporate it and/or to heat or superheat the steam, or the aircraft or its corresponding components is or are provided for this purpose, in particular designed or used for this purpose.

In one embodiment, one or more heat exchangers, especially one or more of the aforesaid heat exchangers, are (respectively) arranged entirely or partially
- in the (respective) propulsion unit;
- in the (respective) pylon;
- in the (respective) wing, especially in a torsion box;
- in the fuselage of the aircraft, especially in front of a torsion box, especially a leading edge, of the wing, and/or at the side next to a cargo compartment; or
- outside of the wing and fuselage, in one embodiment in a housing arranged at the side on the fuselage and/or above the wing.

In a preferred embodiment, at least one heat exchanger, especially at least one of the aforesaid heat exchangers, preferably at least one of the evaporators, is arranged at least partially in the (respective) propulsion unit and/or at least one heat exchanger, especially at least one of the aforesaid heat exchangers, preferably a condenser, is arranged at least partially in the fuselage of the aircraft, especially in front of a torsion box, especially a leading edge, of the wing and/or at the side next to a cargo compartment.

Additionally or alternatively, in one embodiment one or more condensers, especially one or more of the aforesaid condensers, are (respectively) arranged entirely or partially
- in the (respective) propulsion unit;
- in the (respective) pylon;
- in the (respective) wing, especially in a torsion box;
- in the fuselage of the aircraft, especially in front of a torsion box, especially a leading edge, of the wing, and/or at the side next to a cargo compartment; or
- outside of the wing and fuselage, in one embodiment in a housing arranged at the side on the fuselage and/or above the wing.

Additionally or alternatively, in one embodiment one or more water separator, especially one or more of the aforesaid water separators, are
- in the (respective) propulsion unit;
- in the (respective) pylon;
- in the (respective) wing, especially in a torsion box;
- in the fuselage of the aircraft, especially in front of a torsion box, especially a leading edge, of the wing, and/or at the side next to a cargo compartment; or
- outside of the wing and fuselage, in one embodiment in a housing arranged at the side on the fuselage and/or above the wing.

In a preferred embodiment, at least one separation channel of a water separator is arranged outside the wing and fuselage, being in one embodiment in a housing arranged at the side on the fuselage and/or above the wing.

Additionally or alternatively, in one embodiment one or more turbines, especially one or more of the aforesaid turbines, are (respectively) arranged entirely or partially
- in the (respective) propulsion unit;
- in the (respective) pylon;
- in the (respective) wing, especially in a torsion box;

in the fuselage of the aircraft, especially in front of a torsion box, especially a leading edge, of the wing, and/or at the side next to a cargo compartment; or outside of the wing and fuselage, in one embodiment in a housing arranged at the side on the fuselage and/or above the wing.

In a preferred embodiment, at least one turbine, especially a condenser, is arranged outside the wing and fuselage, being in one embodiment in a housing arranged at the side on the fuselage and/or above the wing.

Additionally or alternatively, in one embodiment one or more water pumps, especially one or more of the aforesaid water pumps, are (respectively) arranged entirely or partially in the (respective) propulsion unit;
in the (respective) pylon;
in the (respective) wing, especially in a torsion box;
in the fuselage of the aircraft, especially in front of a torsion box, especially a leading edge, of the wing, and/or at the side next to a cargo compartment; or
outside of the wing and fuselage, in one embodiment in a housing arranged at the side on the fuselage and/or above the wing.

Additionally or alternatively, in one embodiment one or more water treatments (or treatment devices), especially one or more of the aforesaid water treatments (or treatment devices) are (respectively) arranged entirely or partially in the (respective) propulsion unit;
in the (respective) pylon;
in the (respective) wing, especially in a torsion box;
in the fuselage of the aircraft, especially in front of a torsion box, especially a leading edge, of the wing, and/or at the side next to a cargo compartment; or
outside of the wing and fuselage, in one embodiment in a housing arranged at the side on the fuselage and/or above the wing.

Additionally or alternatively, in one embodiment one or more water accumulators, especially one or more of the aforesaid water accumulators, are (respectively) arranged entirely or partially in the (respective) propulsion unit;
in the (respective) pylon;
in the (respective) wing, especially in a torsion box; and/or
in the fuselage of the aircraft, especially in front of a torsion box, especially a leading edge, of the wing, and/or at the side next to a cargo compartment; or
outside of the wing and fuselage, in one embodiment in a housing arranged at the side on the fuselage and/or above the wing.

In a preferred embodiment, at least one water accumulator is arranged in the (respective) wing, especially in the torsion box. Additionally or alternatively, in one embodiment the exhaust gas passage is conducted at least partially through at least one water accumulator, especially this water accumulator, or arranged therein.

Additionally or alternatively, in one embodiment one or more delivery devices, especially blowers and/or fans, for the cooling of a condenser, especially one of the aforesaid condensers, are arranged entirely or partially in the (respective) propulsion unit;
in the (respective) pylon;
in the (respective) wing, especially in a torsion box; and/or
in the fuselage of the aircraft, especially in front of a torsion box, especially a leading edge, of the wing, and/or at the side next to a cargo compartment; or
outside of the wing and fuselage, in one embodiment in a housing arranged at the side on the fuselage and/or above the wing.

In a preferred embodiment, at least one delivery device, especially a blower, for the cooling of a condenser for the condensing of water from exhaust gas of the (respective) heat engine, is situated outside the wing and fuselage, in one embodiment being arranged in a housing arranged at the side on the fuselage and/or above the wing, or in the fuselage, especially in front of a torsion box, especially a leading edge of the wing and/or at the side next to a cargo compartment, in the fuselage of the aircraft. As already explained, in one embodiment at least one condenser, especially a heat exchanger, receives an oncoming flow, especially a through-moving flow for the condensing of water from exhaust gas of the (respective) heat engine by at least one fan driven by this heat engine, especially a gas turbine, or it is designed for this purpose. In particular, this condenser can be partially or fully arranged or integrated in the propulsion unit for this purpose, being situated in one embodiment in an outer channel or bypass flow, moving through (at least) one fan of the gas turbine or being designed for this purpose, and/or surrounding a core channel or flow.

In one embodiment, there is arranged in the exhaust gas passage or at least one of the exhaust gas passages (respectively) downstream from the (respective) heat engine at least one evaporator, downstream from this evaporator at least one condenser, especially at least one heat exchanger and/or, especially downstream from this heat exchanger, at least one turbine, and downstream from this condenser at least one water separator.

In one embodiment, there is arranged in the fluid passage downstream from this water separator at least one water treatment and/or at least one water accumulator, upstream from and/or downstream from this water treatment or this water accumulator there is arranged (respectively) at least one water pump, and downstream from this water pump there is arranged at least one evaporator, especially (an) evaporators in the (respective) exhaust gas passage, from which in one embodiment steam is supplied via at least one steam turbine to the heat engine, especially to a combustion chamber and/or at least one turbine stage of the gas turbine.

In one embodiment, (the) at least one delivery device, especially a blower or the blower for cooling of a condenser situated in the (respective) exhaust gas passage, especially condenser heat exchangers, is coupled to a turbine, especially that of the condenser, or to a steam turbine connected in series with an evaporator, so that the delivery device is or can be driven by the (steam) turbine. Likewise, in one embodiment, at least one fan of a gas turbine of the propulsion unit can cool a condenser arranged in the (respective) exhaust gas passage, especially a condenser heat exchanger, or be designed or used for this purpose, while in one modification this condenser, in particular this condenser heat exchanger, is arranged in the outer channel or bypass flow of the propulsion unit. In general, in one embodiment, the delivery device is driven by the exhaust gas in this way.

In this way, in one embodiment, especially in a combination of two or more of the aforementioned arrangements, one or more of the components arranged in the fluid passage can be positioned advantageously, in particular in a (more) space-saving and/or (more) streamlined or aerodynamically favorable manner.

In particular, thanks to an arrangement
of the evaporator or at least one of the evaporators in the (respective) propulsion unit;

of a segment of the exhaust gas passage, being a multichannel segment in one embodiment, in the (respective) pylon;

of the exhaust gas passage at least partially
in the torsion box and/or
in the water accumulator, arranged in one embodiment in the wing, especially in the torsion box, and/or, downstream from this in one embodiment, in the leading edge region, of the exhaust gas passage, especially the condenser, in one embodiment its heat exchanger being at least partially in the fuselage, in one embodiment being at the side next to the cargo compartment and/or in front of the torsion box, especially the leading edge, and/or of the delivery device and/or the water separator in a housing situated at the side on the fuselage and/or above the wing, respectively, especially in a combination of two or more of the aforementioned arrangements, one or more of the components can be positioned especially advantageously, in particular in a (more) space-saving and/or (more) streamlined or aerodynamically favorable manner.

In one embodiment, an axis of rotation of the delivery device or at least one of the mentioned delivery devices for the cooling of a condenser makes an angle with a longitudinal axis of the aircraft which is at most 30°.

In this way, in one embodiment it is possible to improve the flow through the delivery device and/or to improve the flow resistance of the aircraft.

BRIEF DESCRIPTION OF THE DRAWING FIGURES

Further advantageous modifications of the present invention will emerge from the dependent claims and the following description of preferred embodiments. For this purpose, the following are shown, partially schematized:

DESCRIPTION OF THE INVENTION

Figure 1:
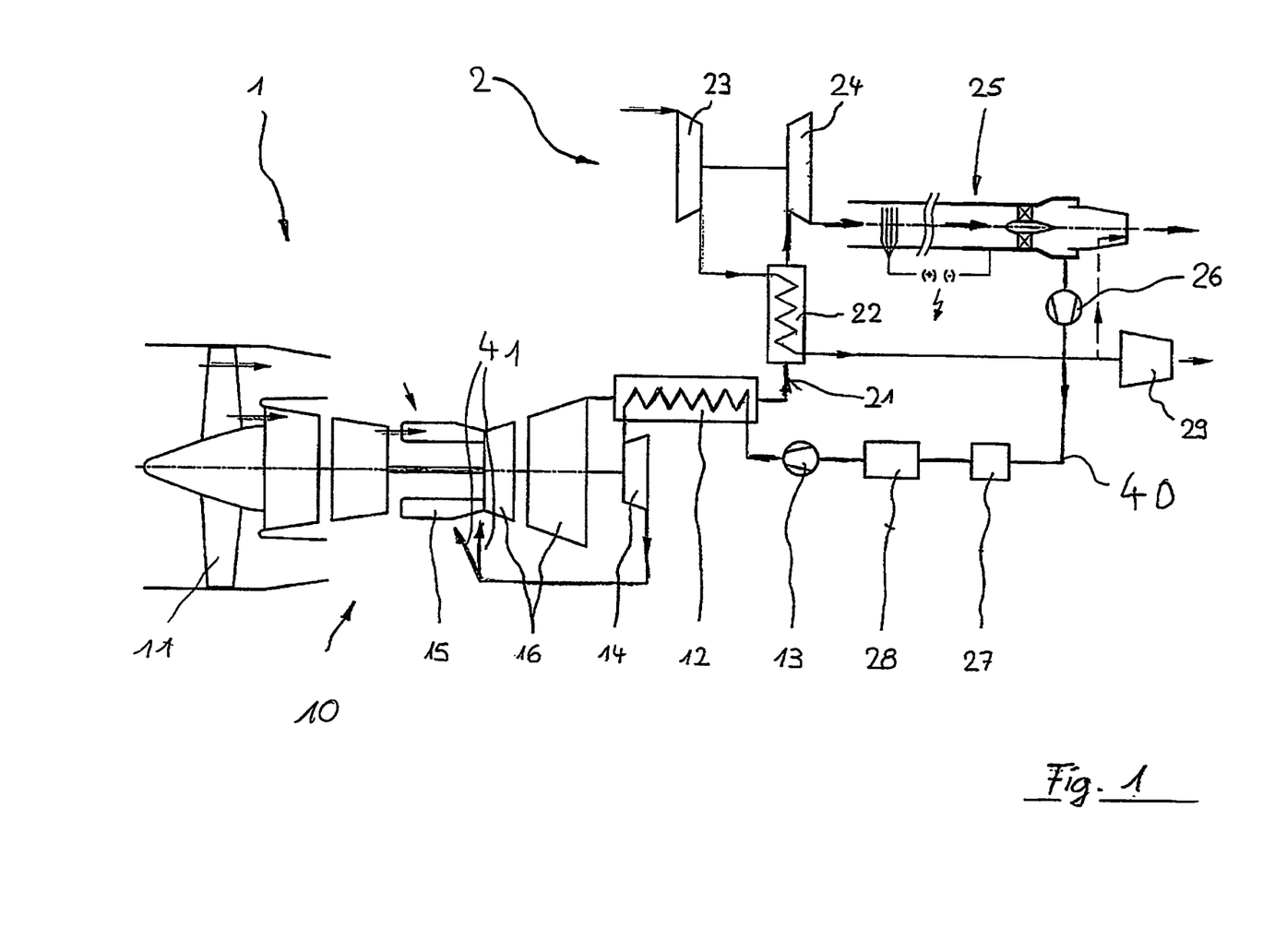
FIG. 1—a flow diagram of a propulsion system of an aircraft according to one embodiment of the present invention.

FIG. 1 shows in the form of a flow diagram the layout of a propulsion system of an aircraft in the form of an airplane 3 according to one embodiment of the present invention.

The propulsion system comprises a turbofan propulsion unit having a heat engine 1 in the form of a gas turbine 10 as well as a water recovery system 2.

The gas turbine 10 comprises a combustion chamber 15 and multiple turbine stages 16.

Its exhaust gas is taken entirely or partially through an evaporator 12, in which the hot exhaust gas surrenders its heat, which is used to evaporate the water.

The resulting steam is taken through working gas outlets 41 to the gas turbine 10 in the area of its combustion chamber 15 and/or to one or more turbine stages 16.

Optionally, a steam turbine 14 may be arranged between the gas turbine 10 and the evaporator 12. The useful power of this steam turbine 14 can be supplied directly in particular to a shaft of the gas turbine 10 or be used to drive auxiliary units of the aircraft.

Through a connection 21, the moist working gas is taken from the heat engine 1 or gas turbine 10 to the wing 32 or the water recovery system 2.

Here, it goes at first through a heat exchanger 22, where it is cooled down enough so that its temperature drops during the following expansion in an A/C turbine 24 below the dew point temperature. Thus, the heat exchanger 22 and/or A/C turbine 24 constitute a condenser.

The water present in the working gas is then at least partially in droplet form and it is separated from the gaseous components of the working gas in a water separator (channel) 25, then pumped by a condensate pump 26 through a fluid passage 40 to a water treatment device 27 and then to a water accumulator 28.

From the water accumulator 28, a feed pump 13 pumps water through the fluid passage 40 to the evaporator 12.

In the heat exchanger 22, heat is transferred from the working gas to the surrounding air.

This is taken away by an A/C blower 23 and vented downstream from the heat exchanger 22 to the surroundings in a cooling air nozzle 29. The A/C blower 23 is driven by the A/C turbine 24.

Figure 2:
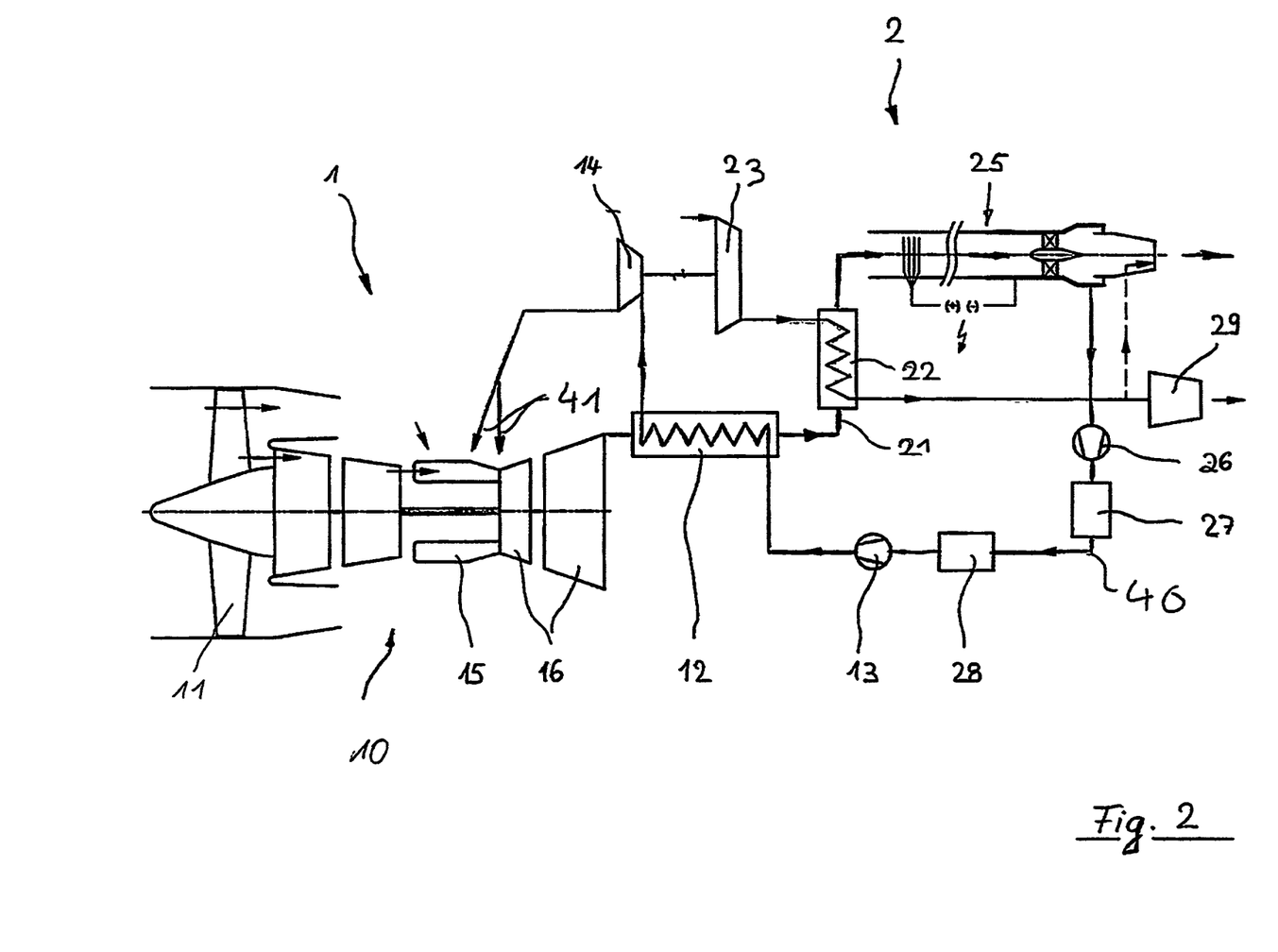
FIG. 2—a flow diagram of a propulsion system of an aircraft according to a further embodiment of the present invention.

FIG. 2 shows in the form of a flow diagram the layout of a propulsion system of an aircraft according to a further embodiment of the present invention. Features corresponding to each other are identified by the same reference numbers, so that reference is made to the previous description and only the differences will be discussed below.

In the embodiment of FIG. 2, there is no A/C turbine 24, so that the heat exchanger 22 constitutes the condenser. The A/C blower 23 is driven by the steam turbine 14.

FIGS. 5-8 respectively show in a front view (FIG. 6), side views (FIGS. 5, 7) and top view (FIG. 8) the aircraft with the propulsion system that has been explained above in reference to FIG. 1.

Unlike what occurs in a conventional engine, the moist exhaust gas in this case after the turbine stages 16 of the gas turbine 10 is not expanded directly in a core engine nozzle, but rather it is taken at first through the steam generator 12 (see FIGS. 5, 6) and then via the connection 21 to the heat exchanger 22 (see FIGS. 6-8), as was explained above with reference to FIGS. 1, 2.

For this, it is taken by multiple channels through a pylon 36 (see FIGS. 5, 6, 8), by which the propulsion unit is fastened on the wing, into a wing 32 of the aircraft. In the wing 32, it is taken through a torsion box 33 (see FIGS. 5, 8) into a leading edge region 39 of the wing. Here, it moves in the direction of the fuselage. After this flow process, it arrives at the A/C turbine 24 (see FIGS. 6-8).

In this process, its temperature is lowered so much that it drops below the dew point and therefore water present in the exhaust gas is at least partially in droplet form. Downstream from the A/C turbine 24 there is arranged the water separator (channel) 25. Here, devices are provided for separating the liquid and the gaseous components.

Figure 6:
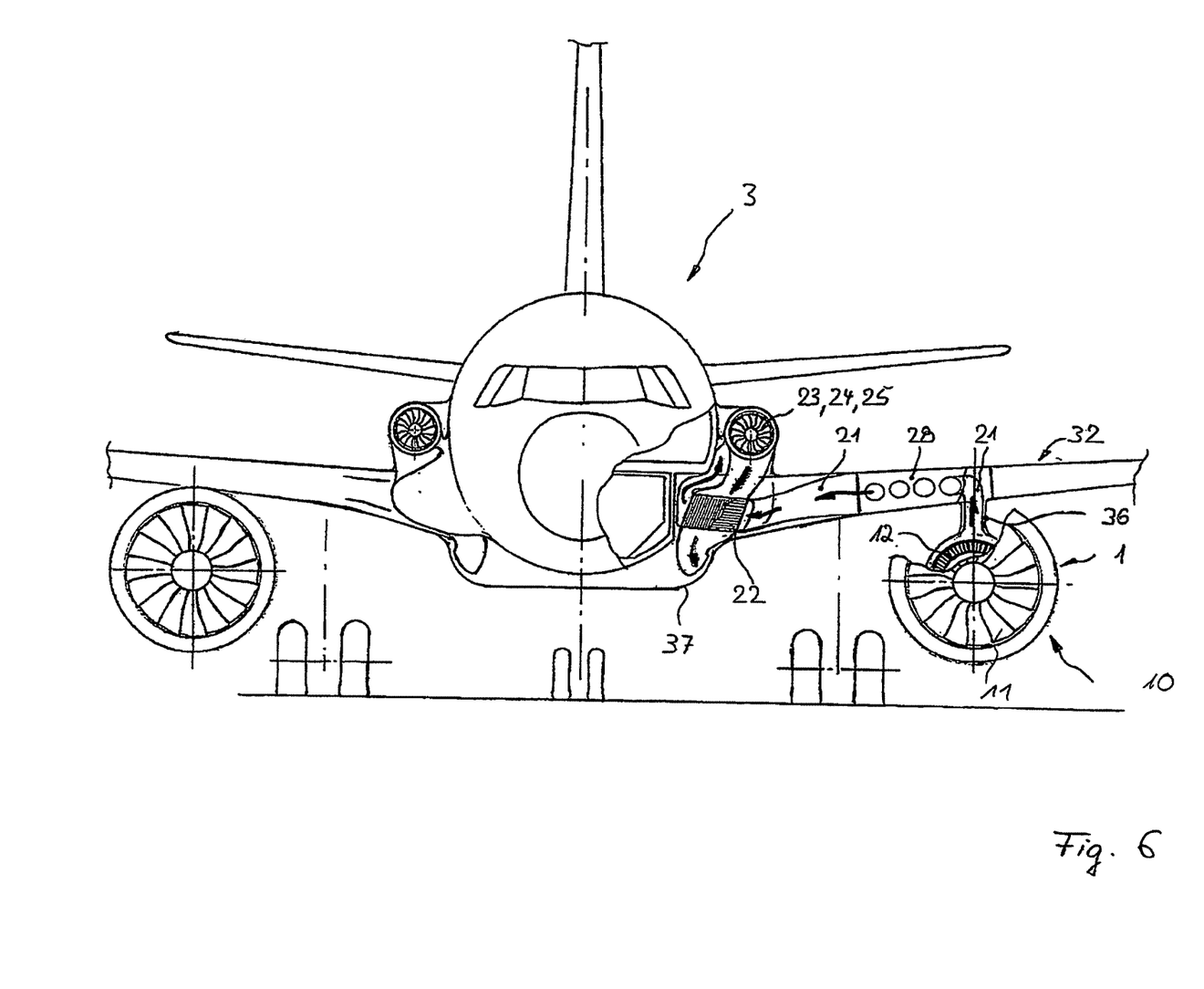
FIG. 6—the aircraft of FIG. 1 in a front view.
Figure 7:
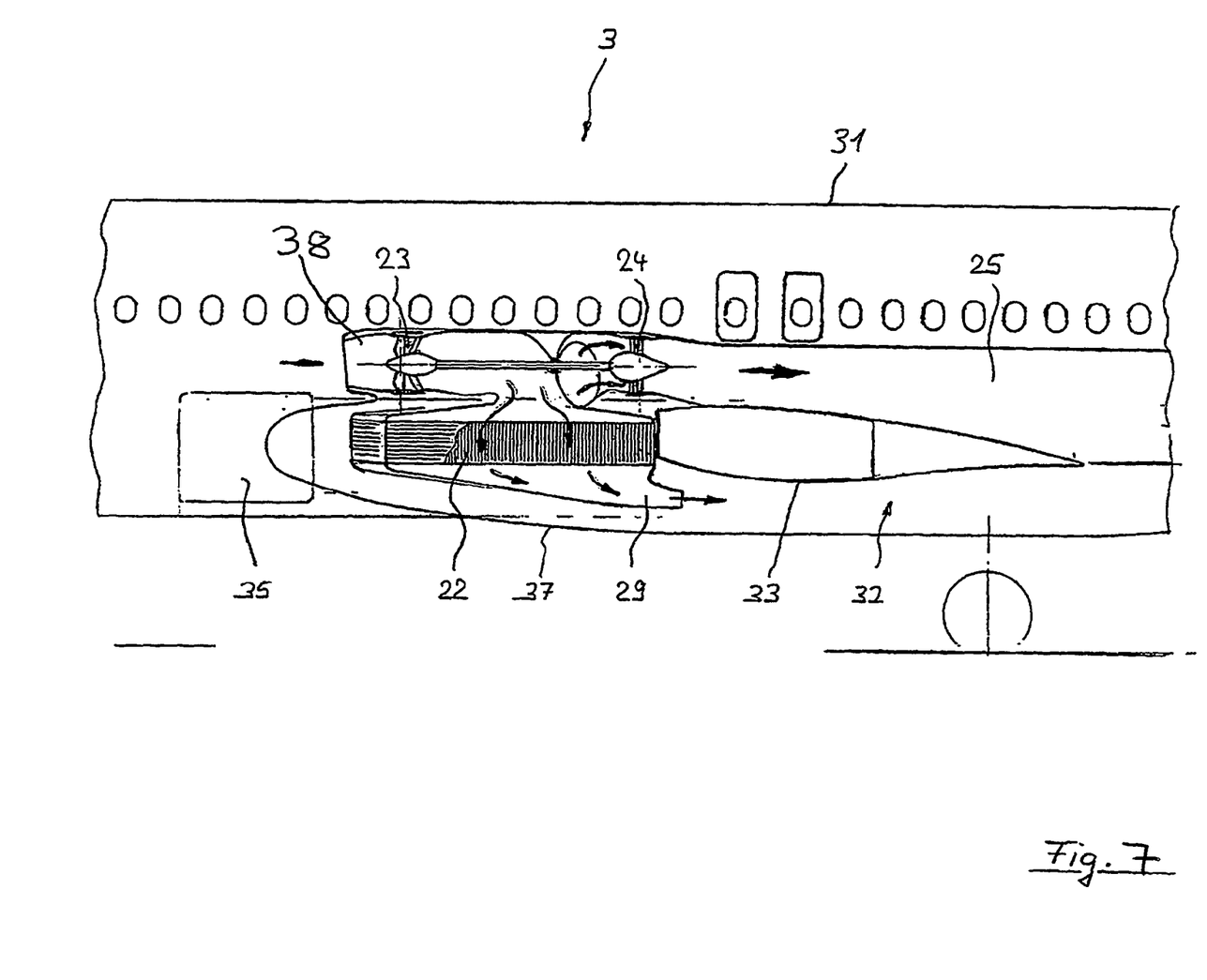
FIG. 7—the aircraft of FIG. 1 in a side view.
Figure 8:
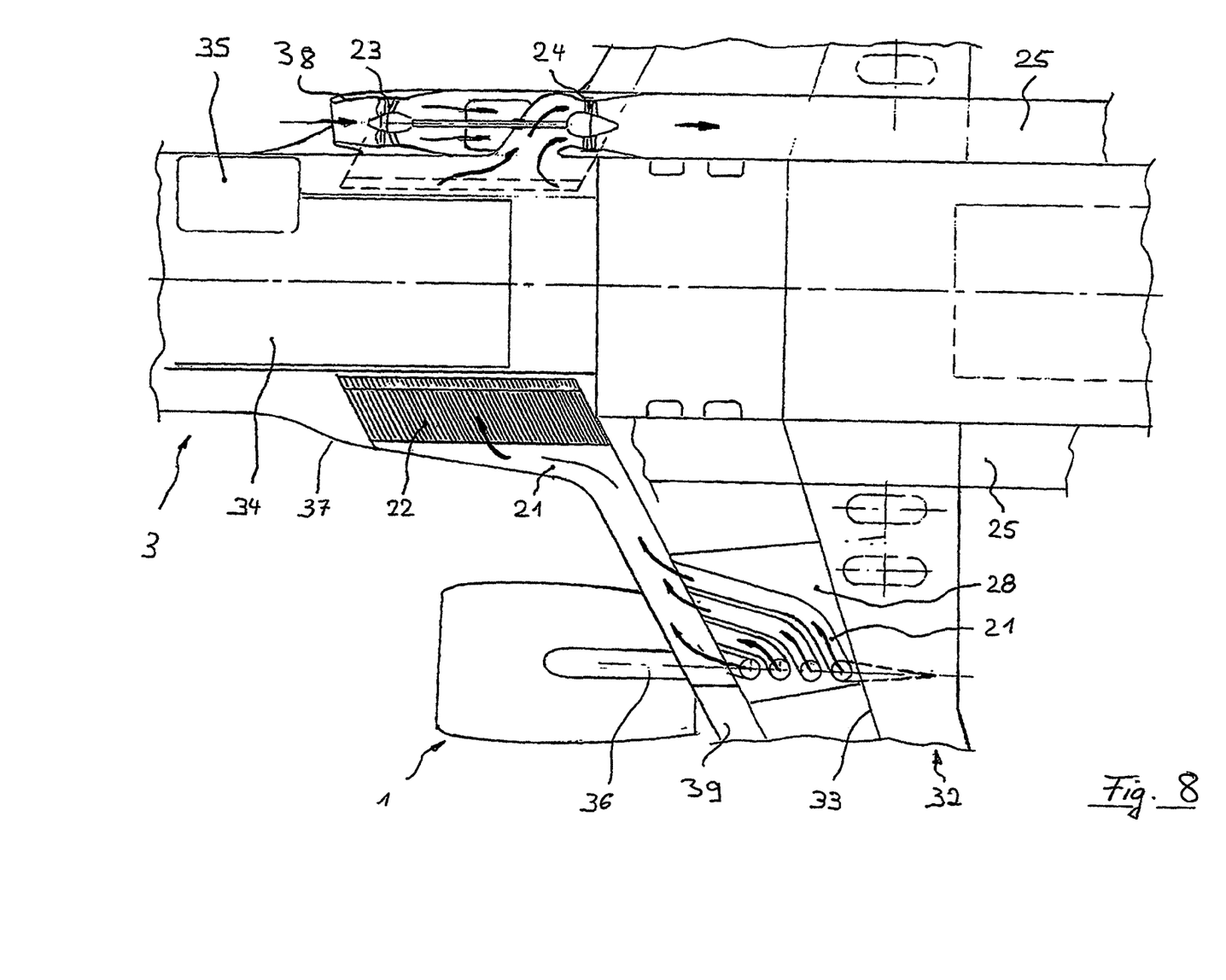
FIG. 8—the aircraft of FIG. 1 in a view from above.

In particular, one may notice in FIGS. 6, 8 that the space at the side, next to a forward cargo or cargo compartment 34, having a cargo compartment door 35 in front of the wing torsion box 33, can be utilized to accommodate parts of the components of the water recovery system 2. In the exemplary embodiment, the heat exchanger 22 is advantageously accommodated here. The A/C blower 23 and the A/C turbine 24 as well as the water separator (channel) 25 are in this way arranged in a housing 38 at the side next to the fuselage 31.

Thanks to this arrangement, the displacement cross section of the airplane 3 is only slightly increased, since the heat exchanger 22 lies in the projection of the wing 32 and the front surface of the A/C blower 23 does not act as a displacement cross section, since it has a flow moving through it. The other components, such as the A/C turbine 24 and the separating channel 25, are arranged in streamlined manner behind the A/C blower 23. The components are partly integrated in streamlined manner in a landing gear cladding 37.

Figure 5:
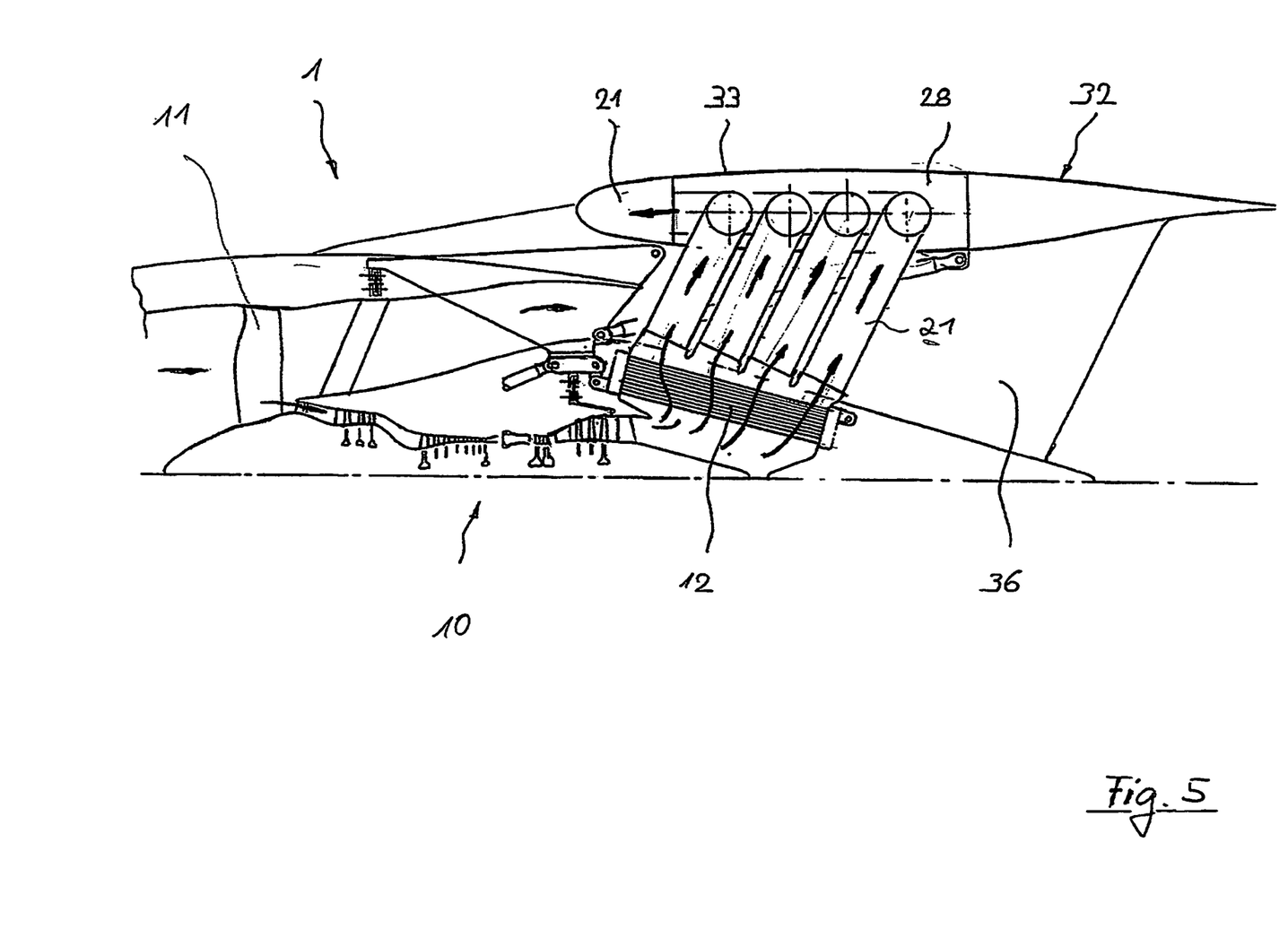
FIG. 5—the aircraft of FIG. 1 in a side view.

In the area of the exhaust gas passage through the wing torsion box 33 there is provided the water storage tank 28 (see FIGS. 5, 6, 8).

Instead of the propulsion system explained above with reference to FIG. 1, there may also be provided on or in the airplane 3 in analogous manner the propulsion system explained above with reference to FIG. 2.

Here, as explained above with reference to FIG. 2, there is no A/C turbine 24, the A/C blower 23 is driven by the steam turbine 14, and the exhaust gas flows directly from the heat exchanger 22 to the separation channel 25.

Figure 3:
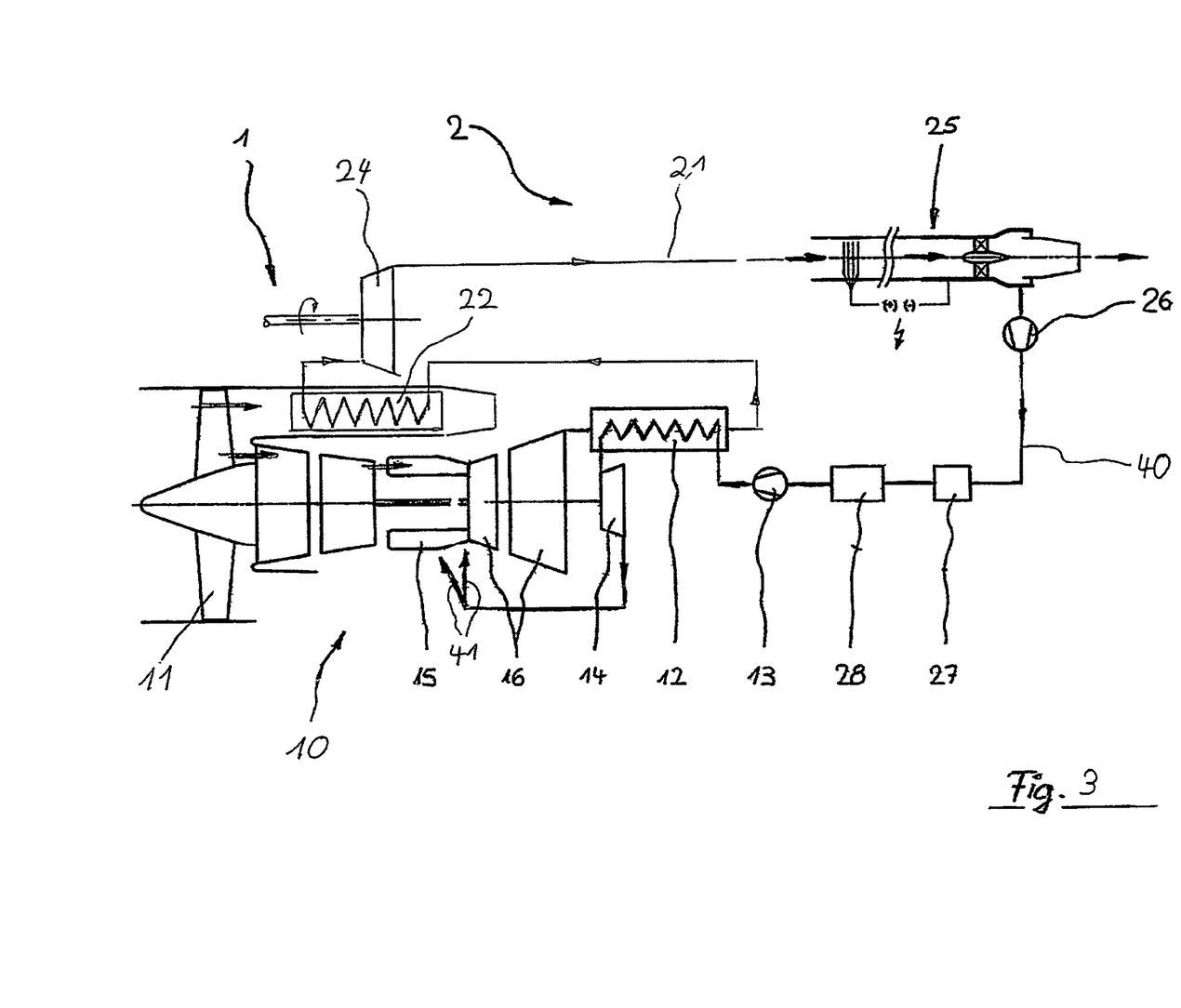
FIG. 3—a flow diagram of a propulsion system of an aircraft according to a further embodiment of the present invention.

FIG. 3 shows in the form of a flow diagram the layout of a propulsion system of an aircraft according to a further embodiment of the present invention. Features corresponding to each other are identified by the same reference numbers, so that reference is made to the previous description and only the differences will be discussed below.

In the embodiment of FIG. 3, the (heat exchanger of the) condenser(s) 22 receives an oncoming flow, especially a moving-through flow of air, which is delivered by a fan 11 of the gas turbine 10, and for this purpose it is arranged in the outer channel or bypass flow of the turbofan propulsion unit. Hence, in particular, there is no blower 23 or cooling air nozzle 29 of the embodiment in FIG. 1 and possibly no optional feeding of cooling air to the water separator 25.

Figure 4:
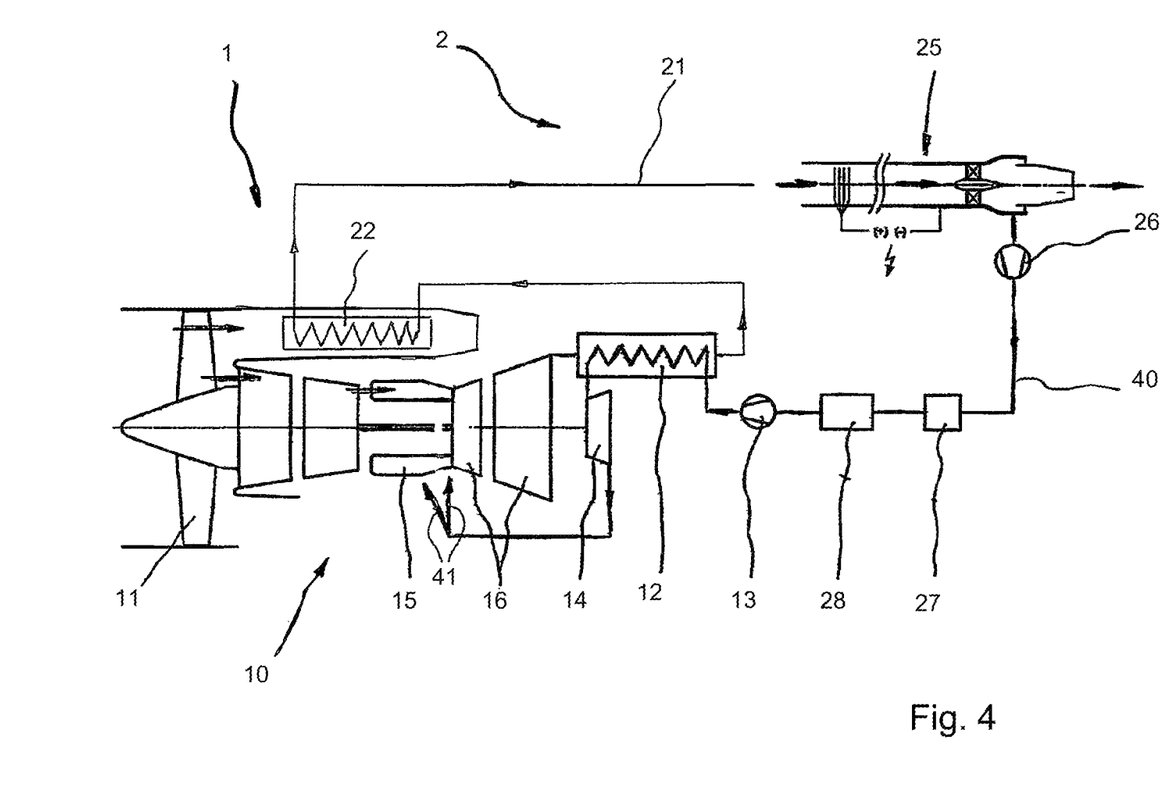
FIG. 4—a flow diagram of a propulsion system of an aircraft according to a further embodiment of the present invention.

FIG. 4 shows in the form of a flow diagram the layout of a propulsion system of an aircraft according to a further embodiment of the present invention. Features corresponding to each other are identified by the same reference numbers, so that reference is made to the previous description and only the differences will be discussed below.

In the embodiment of FIG. 4, the (heat exchanger of the) condenser(s) 22 likewise receives an oncoming flow, especially a moving-through flow of air, which is delivered by a fan 11 of the gas turbine 10, and for this purpose it is arranged in the outer channel or bypass flow of the turbofan propulsion unit. Hence, in particular, there is no blower 23 or cooling air nozzle 29 of the embodiment in FIG. 1 and possibly no optional feeding of cooling air to the water separator 25.

The propulsion systems explained above with reference to FIGS. 2-4 may be used in the aircraft which has been explained in reference to FIGS. 5-8, instead of the propulsion system explained with reference to FIG. 1.

Although the preceding description has explained exemplary embodiments, it should be noted that many modifications are possible. Furthermore, it should be noted that the exemplary embodiments are merely examples and do not in any way limit the scope of protection, the applications, or the layout. Instead, the preceding description will provide the person skilled in the art with guidance for implementing at least one exemplary embodiment, while various changes can be made, especially in regard to the function and arrangement of the described components, without leaving the scope of protection given by the claims and their equivalent combinations of features.

What is claimed is:

1. An aircraft having at least one wing, on which at least one propulsion unit is arranged, comprising at least one heat engine configured as a gas turbine, as well as an exhaust gas passage for conducting exhaust gas of the at least one heat engine into and inside the at least one wing,
   wherein there is arranged in the exhaust gas passage, downstream from the at least one heat engine:
      at least one heat exchanger configured as an evaporator,
      at least one condenser,
      at least one water separator, and/or
      at least one turbine,
   wherein there is arranged in a fluid passage, downstream from the at least one condenser and/or the at least one water separator:
      at least one water pump,
      at least one water treatment device,
      at least one water accumulator,
      at least one heat exchanger, and/or
      at least one steam turbine, and/or
      at least one outlet of the fluid passage is arranged at the at least one heat engine at a combustion chamber and/or a turbine stage of the gas turbine.

2. The aircraft according to claim 1, wherein the exhaust gas passage is arranged at least partially
   in a pylon, which connects the at least one propulsion unit to the at least one wing, and/or
   a torsion box and/or a leading edge region of the at least one wing, and/or,
   in front of a torsion box and leading edge of the at least one wing and/or at the side next to a cargo compartment, in a fuselage of the aircraft.

3. The aircraft according to claim 1, further comprising:
   at least one delivery device for cooling a condenser arranged
   at least partially in the at least one propulsion unit,
   at least partially in a pylon,
   at least partially in the torsion box of the at least one wing,
   at least partially in a fuselage of the aircraft or at least partially in a housing situated at a side on the fuselage and/or above the at least one wing.

* * * * *